US012729048B2

(12) United States Patent
Nelson

(10) Patent No.: US 12,729,048 B2
(45) Date of Patent: Sep. 8, 2026

(54) DOMESTIC APPLIANCE PACKAGING BASE PAD

(71) Applicant: Haier US Appliance Solutions, Inc., Wilmington, DE (US)

(72) Inventor: Nathan Ernell Nelson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/055,602

(22) Filed: Feb. 18, 2025

(65) Prior Publication Data

US 2026/0242115 A1 Aug. 20, 2026

(51) Int. Cl.

*B65D 81/133* (2006.01)
*B31D 5/00* (2017.01)
*B65D 81/05* (2006.01)
*B65D 85/64* (2006.01)
*B65D 85/68* (2006.01)

(52) U.S. Cl.

CPC ......... *B65D 81/133* (2013.01); *B31D 5/0021* (2013.01); *B65D 81/053* (2013.01); *B65D 85/64* (2013.01); *B65D 85/68* (2013.01); *B31D 2205/0005* (2013.01); *B65D 2581/02* (2013.01); *B65D 2585/649* (2013.01); *B65D 2585/682* (2013.01)

(58) Field of Classification Search

CPC ...... B65D 81/133; B65D 85/68; B65D 81/02; B65D 2585/649; B65D 2585/6802; B65D 2585/682; B65D 85/64; B65D 2581/053; B31D 2205/0005; B31D 5/0021

USPC .................. 206/320; 229/406; 248/678, 688, 248/346.01, 346.02, 346.4; 108/51.3, 108/55.3

See application file for complete search history.

(56) References Cited

U.S. PATENT DOCUMENTS

| | | | | |
|---|---|---|---|---|
| 2,665,002 A * | 1/1954 | Baumann | B65D 5/5092 206/320 |
| 4,130,199 A * | 12/1978 | Sorenson | B65D 5/5028 206/320 |
| 4,375,261 A | 3/1983 | Kitchell | |
| 5,277,310 A * | 1/1994 | Mertz | B65D 85/64 206/320 |
| 6,264,157 B1 * | 7/2001 | Muyskens | B65D 19/0002 248/346.03 |
| 7,624,962 B2 * | 12/2009 | Muyskens | B65D 81/133 248/678 |

(Continued)

FOREIGN PATENT DOCUMENTS

| | | |
|---|---|---|
| CN | 220391885 U | 1/2024 |
| CN | 117799959 A | 4/2024 |

(Continued)

*Primary Examiner* — Rafael A Ortiz

(74) *Attorney, Agent, or Firm* — Dority & Manning, P.A.

(57) ABSTRACT

A method of forming a packaging base pad for a domestic appliance includes providing a flat blank. The method also includes folding a left inner side panel and a right inner side panel of the flat blank outwards away from each other. The method further includes folding a left outer side panel and a right outer side panel of the flat blank inwards towards each other. Moreover, the method includes folding a left side panel and a right side panel of the flat blank inwards towards each other. In addition, the method includes folding a top panel towards a bottom panel.

20 Claims, 9 Drawing Sheets

(56) References Cited

U.S. PATENT DOCUMENTS

| | | | | |
|---|---|---|---|---|
| 7,980,184 | B2 * | 7/2011 | Olvey | B65D 19/0012 248/346.02 |
| 9,731,861 | B2 | 8/2017 | Cram | |
| 2004/0108434 | A1 * | 6/2004 | Olvey | B65D 19/0036 248/346.02 |
| 2006/0065561 | A1 * | 3/2006 | Marventano | B65D 61/00 53/442 |

FOREIGN PATENT DOCUMENTS

| | | | | |
|---|---|---|---|---|
| WO | WO2022194369 | A1 | 9/2022 | |
| WO | WO-2025073393 | A1 * | 4/2025 | B65D 85/68 |

* cited by examiner

DOMESTIC APPLIANCE PACKAGING BASE PAD

FIELD OF THE INVENTION

The present subject matter relates generally to a packaging base pad, and more particularly to a packaging base pad for a domestic appliance.

BACKGROUND OF THE INVENTION

Domestic appliances (e.g., dishwashing appliances, refrigerator appliances, oven appliances, etc.) are available in a variety of configurations. Often, in order to ship domestic appliances, robust packaging assemblies are required. These packaging assemblies may be configured to protect the domestic appliances during shipping and handling of the domestic appliance. For instance, the packaging assemblies typically include some sort of cushioning to help absorb shock (e.g., from drops or impacts) that may be experienced during shipping and handling.

Commonly, expanded polystyrene (EPS) is utilized as cushioning for packaging assemblies of domestic appliances. However, challenges exist with the use of EPS as a cushioning. For example, while EPS is recyclable, it is typically only recyclable at specific drop-off sites. This can cause inconveniences for a user as EPS often cannot be recycled through domestic recycling streams. Furthermore, EPS is often glued to a frame (e.g., a cardboard frame) of the packaging assembly. In such cases, even if the packaging assembly is brought to a drop off site, the packaging assembly can still end up in a landfill where they are not recycled as the EPS may be difficult and time consuming to separate from the frame. Additionally, EPS has a propensity to crumble or break apart during shipping. Additionally, loose pieces of EPS may cause a mess when a user unpacks their domestic appliance.

Accordingly, a packaging base pad for a domestic appliance that obviates one or more of the above-mentioned drawbacks would be beneficial.

BRIEF DESCRIPTION OF THE INVENTION

Aspects and advantages of the invention will be set forth in part in the following description, or may be apparent from the description, or may be learned through practice of the invention.

In one exemplary aspect of the present disclosure, a flat blank for forming a packaging base pad for a domestic appliance is provided. The flat blank includes a bottom panel, a left side panel directly joined to a left side of the bottom panel at a first seam, a right side panel directly joined to a right side of the bottom panel at a second seam, and a top panel directly joined to a top side of the bottom panel at a third seam. The top panel includes a first portion and a second portion spaced from each other, a left outer side panel directly joined to a left side of the first portion at a fourth seam, a left inner side panel directly joined to a right side of the first portion at a fifth seam, a right outer side panel directly joined to a right side of the second portion at a sixth seam, and a right inner side panel directly joined to a left side of the second portion at a seventh seam. The left inner side panel is configured to contact the domestic appliance when the flat blank is folded to form the packaging base pad. The right inner side panel is configured to contact the domestic appliance when the flat blank is folded to form the packaging base pad. The left side panel, the first portion, and the left outer side panel are configured to be intermediate layers arranged between the bottom panel and the left inner side panel when the flat blank is folded to form the packaging base pad. The right side panel, the second portion, and the right outer side panel are configured to be intermediate layers arranged between the bottom panel and the right inner side panel when the flat blank is folded to form the packaging base pad.

In one exemplary aspect of the present disclosure, a method of forming a packaging base pad for a domestic appliance is provided. The method includes providing a flat blank. The flat blank includes a bottom panel, a left side panel directly joined to a left side of the bottom panel at a first seam, a right side panel directly joined to a right side of the bottom panel at a second seam, and a top panel directly joined to a top side of the bottom panel at a third seam. The top panel includes a first portion and a second portion spaced from each other, a left outer side panel directly joined to a left side of the first portion at a fourth seam, a left inner side panel directly joined to a right side of the first portion at a fifth seam, a right outer side panel directly joined to a right side of the second portion at a sixth seam, and a right inner side panel directly joined to a left side of the second portion at a seventh seam. The method also includes folding the left inner side panel and the right inner side panel of the flat blank outwards away from each other. The method further includes folding the left outer side panel and the right outer side panel of the flat blank inwards towards each other. Moreover, the method includes folding the left side panel and the right side panel of the flat blank inwards towards each other. In addition, the method includes folding the top panel towards the bottom panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
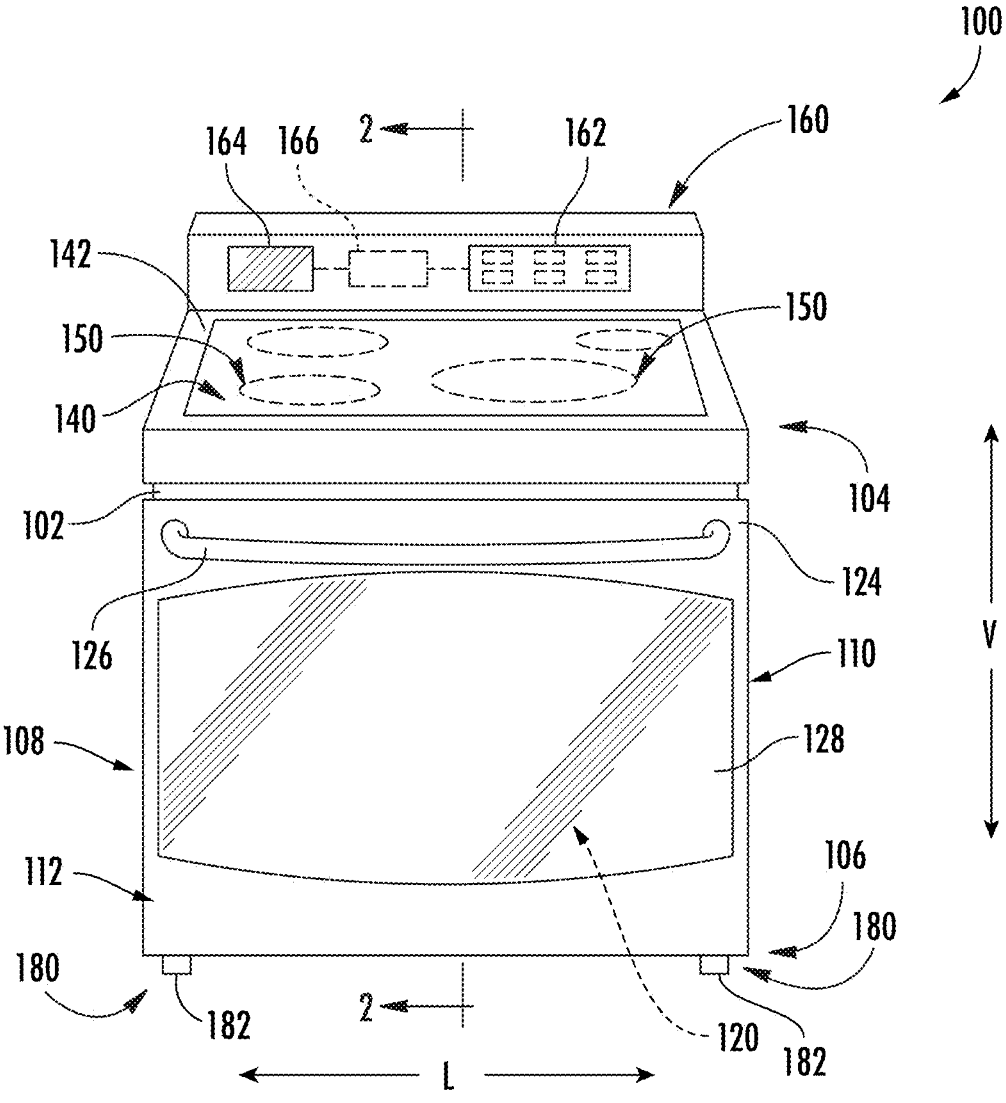
FIG. 1 provides a front view of an exemplary domestic appliance, e.g., an exemplary oven appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Figure 2:
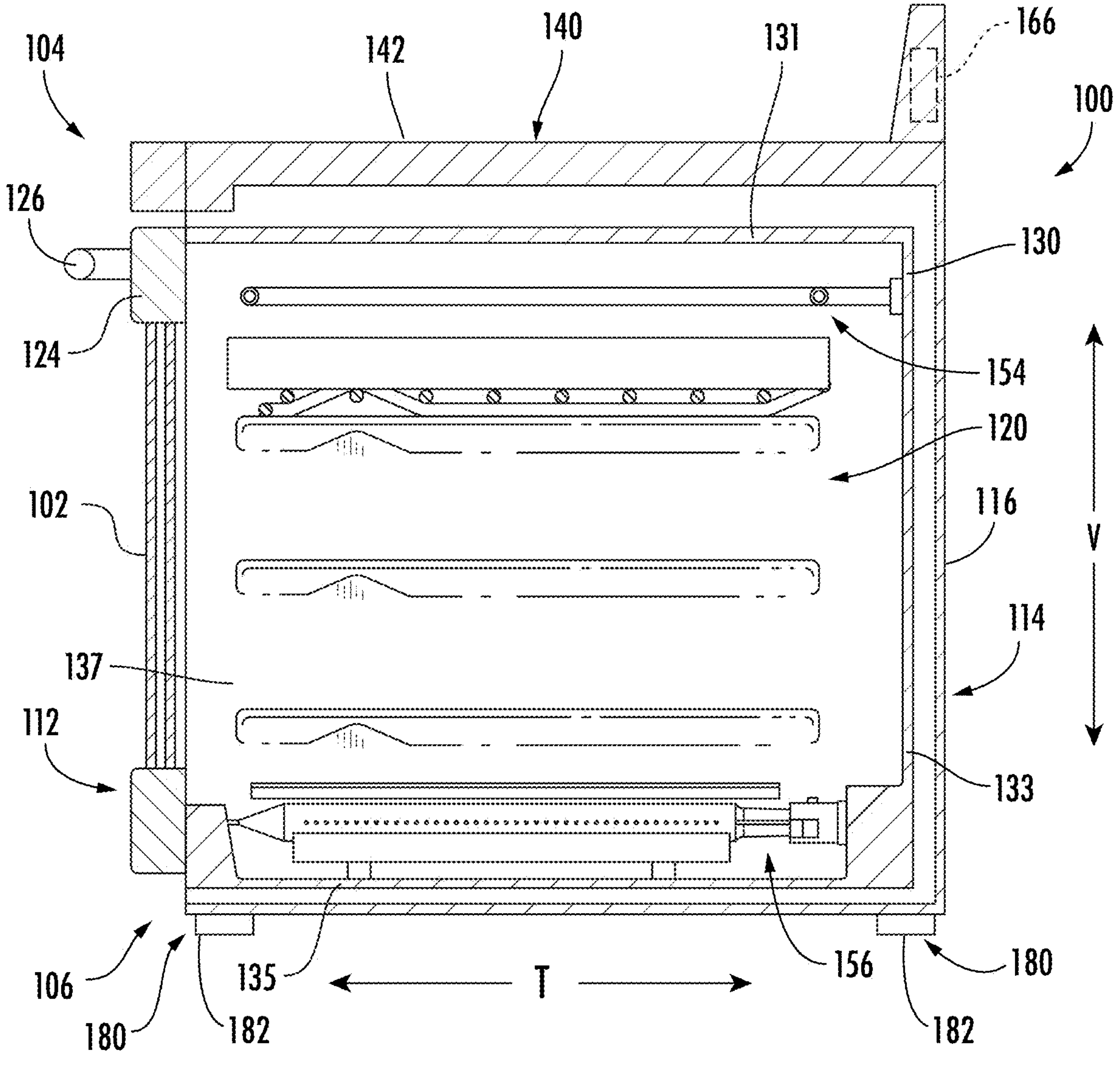
FIG. 2 provides a side cross-sectional view of the example oven appliance of FIG. 1.

Referring to FIGS. 1-2, an exemplary domestic appliance, e.g., an oven appliance 100, according to one or more embodiments of the present subject matter. The oven appliance 100 generally defines a vertical direction V, a lateral direction L, and a transverse direction T, each of which is mutually perpendicular, such that an orthogonal coordinate system is generally defined. As illustrated, the oven appliance 100 includes an insulated cabinet 102. The cabinet 102 of the oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

As shown, the oven appliance 100 may include a plurality of legs (identified herein generally by reference numeral 180). Each of the legs 180 may be mounted to the cabinet 102 for supporting the oven appliance 100 on a floor (not shown) of a dwelling. In general, each of the legs 180 may be adjustable along the vertical direction V relative to the bottom 106 of the cabinet 102. For example, the legs 180 may include a threaded portion (not numbered) and may be received within a threaded aperture (not numbered) defined by or on the cabinet 102. In this manner, rotating the legs 180 in the clockwise or counterclockwise reduces or increases a leg height that is measured between the bottom 106 of the cabinet 102 and a bottom 182 of the legs 180 along the vertical direction V. In this manner, an installer of the oven appliance 100 may rotate the legs 180 to ensure that the cabinet 102 is level and stable on the floor of the dwelling.

However, it should be appreciated that the oven appliance 100 is provided by way of example only, and aspects of the present subject matter may be used in any suitable domestic appliance, such as a refrigerator appliance, a laundry appliance, a dishwasher appliance, or the like. Thus, the example embodiment shown in FIG. 1 is not intended to limit the present subject matter to any particular domestic appliance.

Within the cabinet 102 is a cooking chamber 120 which is configured for the receipt of one or more food items to be cooked. The oven appliance 100 includes a door 124 rotatably attached to the cabinet 102 in order to permit selective access to the cooking chamber 120. A handle 126 is mounted to the door 124 to assist a user with opening and closing the door 124 in order to access the cooking chamber 120. As an example, a user can pull on the handle 126 mounted to the door 124 to open or close the door 124 and access the cooking chamber 120. One or more transparent viewing windows 128 (e.g., FIG. 1) may be defined within the door 124 to provide for viewing the contents of the cooking chamber 120 when the door 124 is closed and also assist with insulating the cooking chamber 120.

In general, the cooking chamber 120 is defined by a plurality of chamber walls 130. Specifically, the cooking chamber 120 may be defined by the chamber walls 130. The chamber walls 130 may include a top wall 131, a rear wall 133, a bottom wall 135, and two sidewalls 137. These chamber walls 130 may be joined together to define an opening through which a user may selectively access the cooking chamber 120 by opening the door 124. In order to insulate the cooking chamber 120, the oven appliance 100 includes an insulation gap defined between the chamber walls 130 and the cabinet 102. According to an exemplary embodiment, the insulation gap is filled with an insulating material, such as insulating foam or fiberglass, for insulating the cooking chamber 120.

The oven appliance 100 may also include a cooktop 140. The cooktop 140 is positioned at or adjacent to the top 104 of the cabinet 102 such that it is positioned above the cooking chamber 120. Specifically, the cooktop 140 includes a top panel 142 positioned proximate to the top 104 of the cabinet 102. As illustrated in exemplary embodiments, the top panel 142 may be constructed of glass, ceramics, enameled steel, and combinations thereof. In some other embodiments, the top panel includes one or more grates that are supported on a top surface of the top panel 142 for supporting cooking utensils, such as pots or pans, during a cooking process.

The oven appliance 100 may further include one or more heating elements for selectively heating cooking utensils positioned on the top panel 142 or food items positioned within the cooking chamber 120. For example, referring to FIG. 1, the oven appliance 100 includes heating elements 150 at the top panel 142. The heating elements 150 may be induction heating elements, resistive heating elements, radiant heating elements, or gas burners. Specifically, a plurality of induction heating elements may be mounted, for example on or below the top panel 142. While shown with four heating elements 150 in the exemplary embodiment of FIG. 1, the oven appliance 100 may include any number of heating elements 150 in alternative exemplary embodiments. The heating elements 150 may also have various diameters. For example, each heating element 150 can have a different diameter, the same diameter, or any suitable combination thereof.

In addition, heating elements may be positioned within or may otherwise be in thermal communication with cooking chamber 120 for regulating the temperature within the cooking chamber 120. Specifically, an upper gas heating element 154 may be positioned in the cabinet 102 at a top portion of the cooking chamber 120, and a lower gas heating element 156 may be positioned at a bottom portion of the cooking chamber 120. The upper gas heating element 154 and the lower gas heating element 156 may be used independently or simultaneously to heat the cooking chamber 120, perform a baking or broil operation, perform a cleaning cycle, etc. The size and heat output of the upper gas heating element 154 and the lower gas heating element 156 can be selected based on, e.g., the size of the oven appliance 100 or the desired heat output. The oven appliance 100 may include any other suitable number, type, and configuration of heating elements 150 within the cabinet 102 or on the cooktop 140. For example, the oven appliance 100 may further include electric heating elements, induction heating elements, or any other suitable heat generating device.

In some embodiments, a control panel assembly 160 is located within convenient reach of a user of the oven appliance 100. The control panel assembly 160 may include one or more user-interface inputs 162 and a graphical display 164, which may be separate from or integrated with the user-interface inputs 162. The user-interface inputs 162 may each be associated with one of the heating elements 150. In this manner, user-interface inputs 162 allow the user to activate each heating element 150, 154, 156 and determine the amount of heat input provided by each heating element 150, 154, 156 for cooking food items within the cooking chamber 120 or on the cooktop 140. Although shown as touch inputs, it should be understood that the configuration of the user-interface inputs 162 of the oven appliance 100 shown in FIG. 1 is provided by way of example only. More specifically, the control panel assembly 160 may include various input components, such as one or more of a variety of touch-type controls, electrical, mechanical or electro-mechanical input devices including rotary dials, push buttons, and touch pads. The graphical display 164 may be designed to provide operational feedback or other information to the user such as e.g., whether a particular heating elements 150, 154, 156 are activated or the rate at which the heating elements 150, 154, 156 are set. Indeed, according to the illustrated embodiment, the control panel assembly 160 includes the graphical display 164, such as a liquid crystal display with an interactive display and interface.

Generally, the oven appliance 100 may include a controller 166 in operative communication with the control panel assembly 160. The control panel assembly 160 of the oven appliance 100 may be in communication with the controller 166 via, for example, one or more signal lines or shared communication buses, and signals generated in the controller 166 operate the oven appliance 100 in response to user input via user input devices, e.g., the user-interface inputs 162 or the graphical display 164. Input/Output ("I/O") signals may be routed between the controller 166 and various operational components of the oven appliance 100 such that operation of the oven appliance 100 can be regulated by the controller 166. In addition, the controller 166 may also be in communication with one or more sensors, such as a temperature sensor, which may be positioned within the cooking chamber 120 and used to measure temperature inside the cooking chamber 120 and provide such measurements to the controller 166. It should be appreciated that other sensor types, positions, and configurations may be used according to alternative embodiments.

The controller 166 is a "processing device" or "controller" and may be embodied as described herein. The controller 166 may include a memory and one or more microprocessors, microcontrollers, application-specific integrated circuits (ASICS), CPUs or the like, such as general or special purpose microprocessors operable to execute programming instructions or micro-control code associated with operation of the oven appliance 100, and the controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, the controller 166 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

Although aspects of the present subject matter are described herein in the context of a single oven appliance, it should be appreciated that the oven appliance 100 is provided by way of example only. Other domestic appliances having different configuration or different features may also be utilized with the present subject matter. For example, refrigerator appliance, washing machine appliance, dishwasher appliance, or the like may be utilized with the present subject matter.

Figure 3:
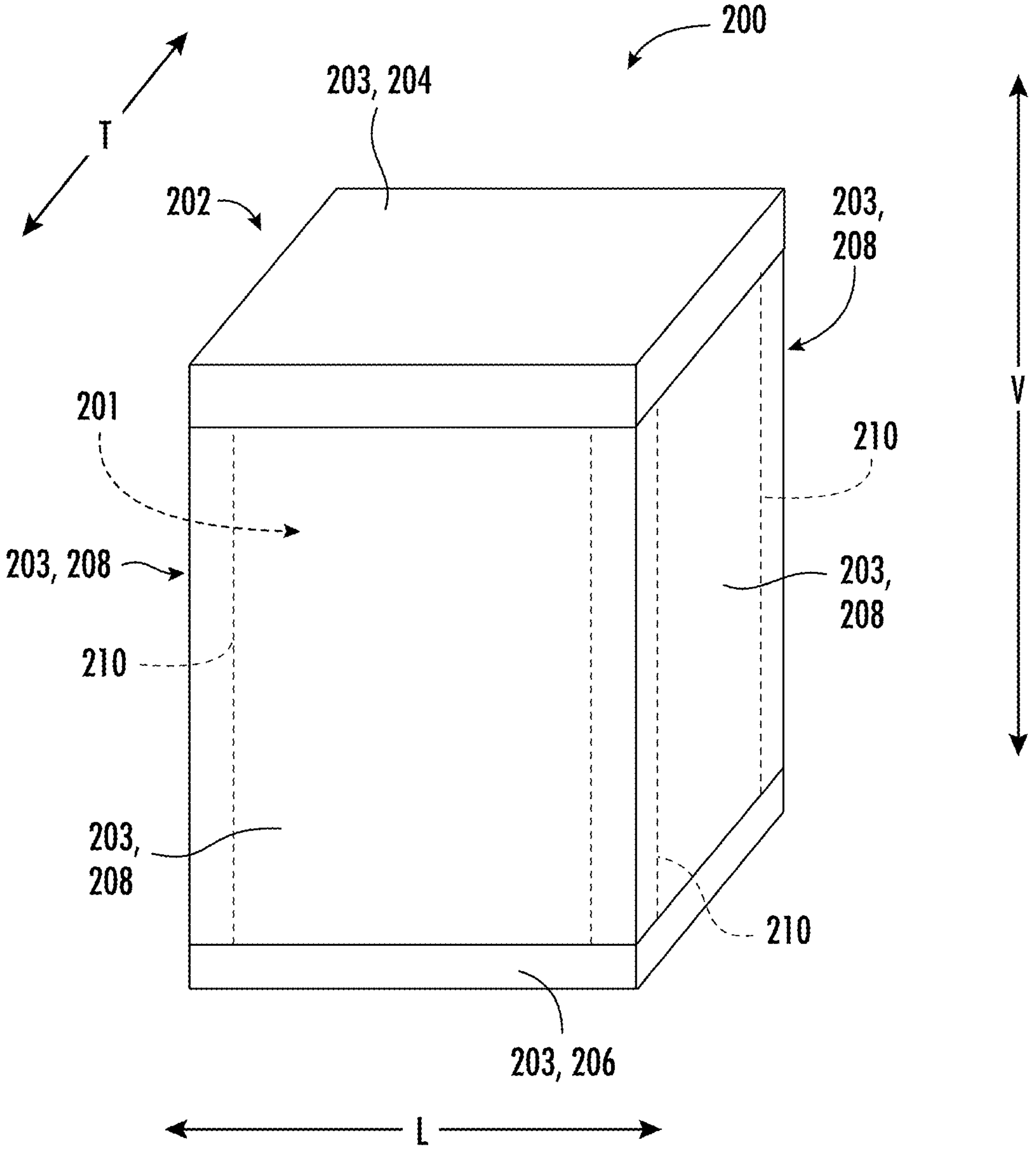
FIG. 3 provides a perspective view of a packaging according to one or more exemplary embodiments of the present disclosure.

Referring to FIG. 3, an exemplary domestic appliance packaging assembly 200 for a domestic appliance, such as the oven appliance 100, is provided. The packaging assembly 200 may include a corrugated package frame 202 that may include one or more frame components. For instance, the corrugated package frame 202 may include one or more packaging walls 203 such as a top pad 204, a skid or base pad 206, and/or a plurality of side walls 208. Furthermore, the package frame 202 may include a plurality of corner post frames 210. The base pad 206 may be positioned below and spaced apart from the top pad 204 in the vertical direction V. The plurality of side walls 208 may be positioned apart from each other in the lateral direction L and/or the transverse direction T and extend from the base pad 206 to the top pad 204 and connect the base pad 206 and the top pad 204. As such, the package frame 202 may define an internal chamber 201 that may be complementary to a predetermined domestic appliance (e.g., the oven appliance 100, a refrigerator, a dishwasher, etc.) of domestic appliance packaging assembly 200. The domestic appliance of domestic appliance packaging assembly 200, such as the oven appliance 100 or any other suitable domestic appliance, may be positioned within internal chamber 101 on top of the base pad 206. In this respect, the domestic appliance is at least partially enclosed by the packaging wall(s) 103.

Figure 4:
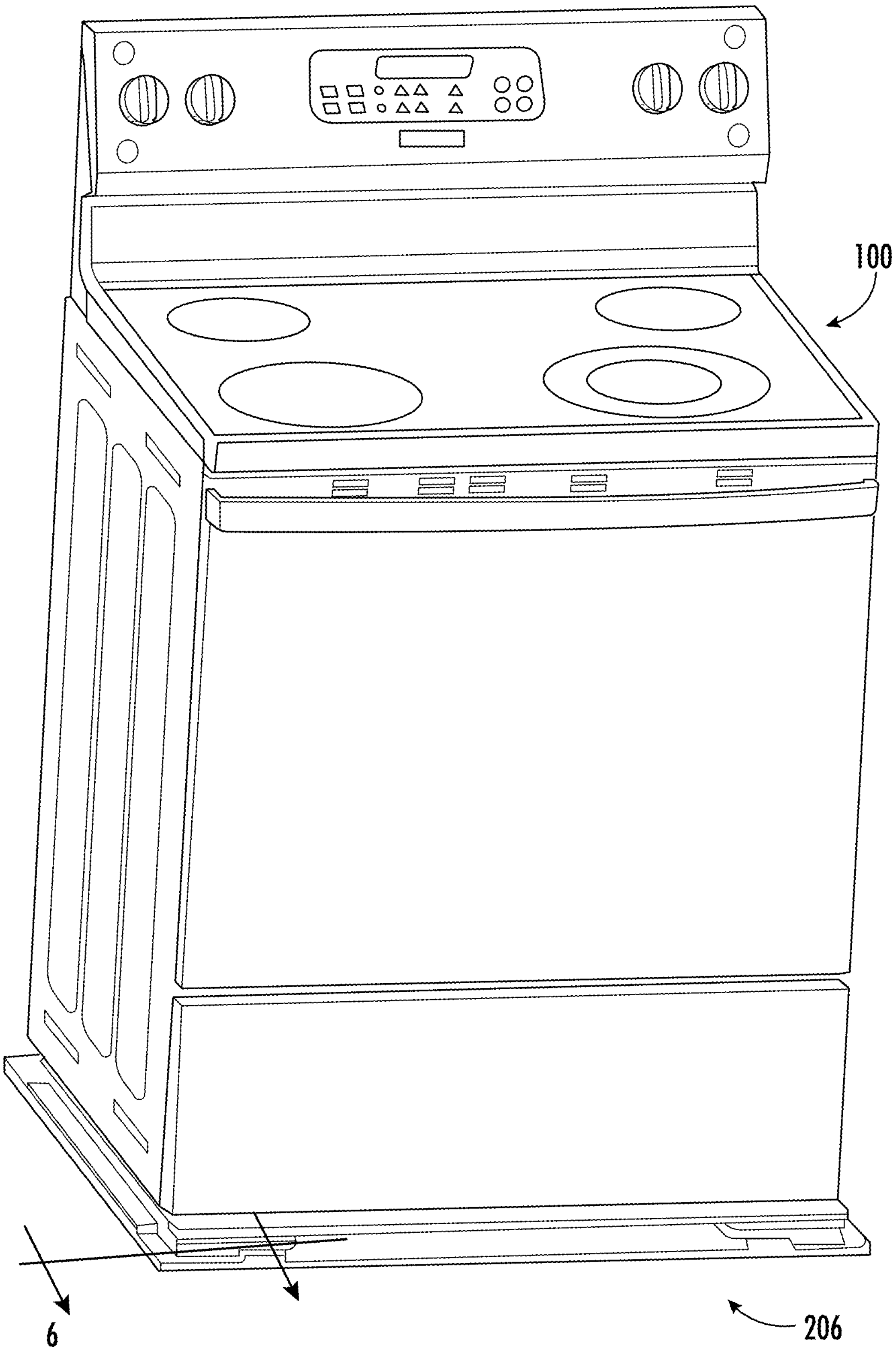
FIG. 4 is a perspective view of a packaging base pad for a domestic appliance according to one or more example embodiments of the present subject matter.

Referring now to FIG. 4, an exemplary base pad 206 for supporting a domestic appliance, such as the oven appliance 100, is provided. The base pad 206 may include five layers (as described further below) to provide energy absorption during shock events (e.g., from drops or impacts) that may be experienced during shipping/transport. Providing the base pad 206 with five layers provides increased energy absorption as compared to current four layer base pads while also permitting removal of additional energy absorption materials, such as EPS, that may not be recyclable through domestic recycling sites. As such, the base pad 206 of the present disclosure can improve energy absorption capabilities of packaging assemblies for domestic appliances while reducing waste associated with the packaging assemblies.

Figure 5A:
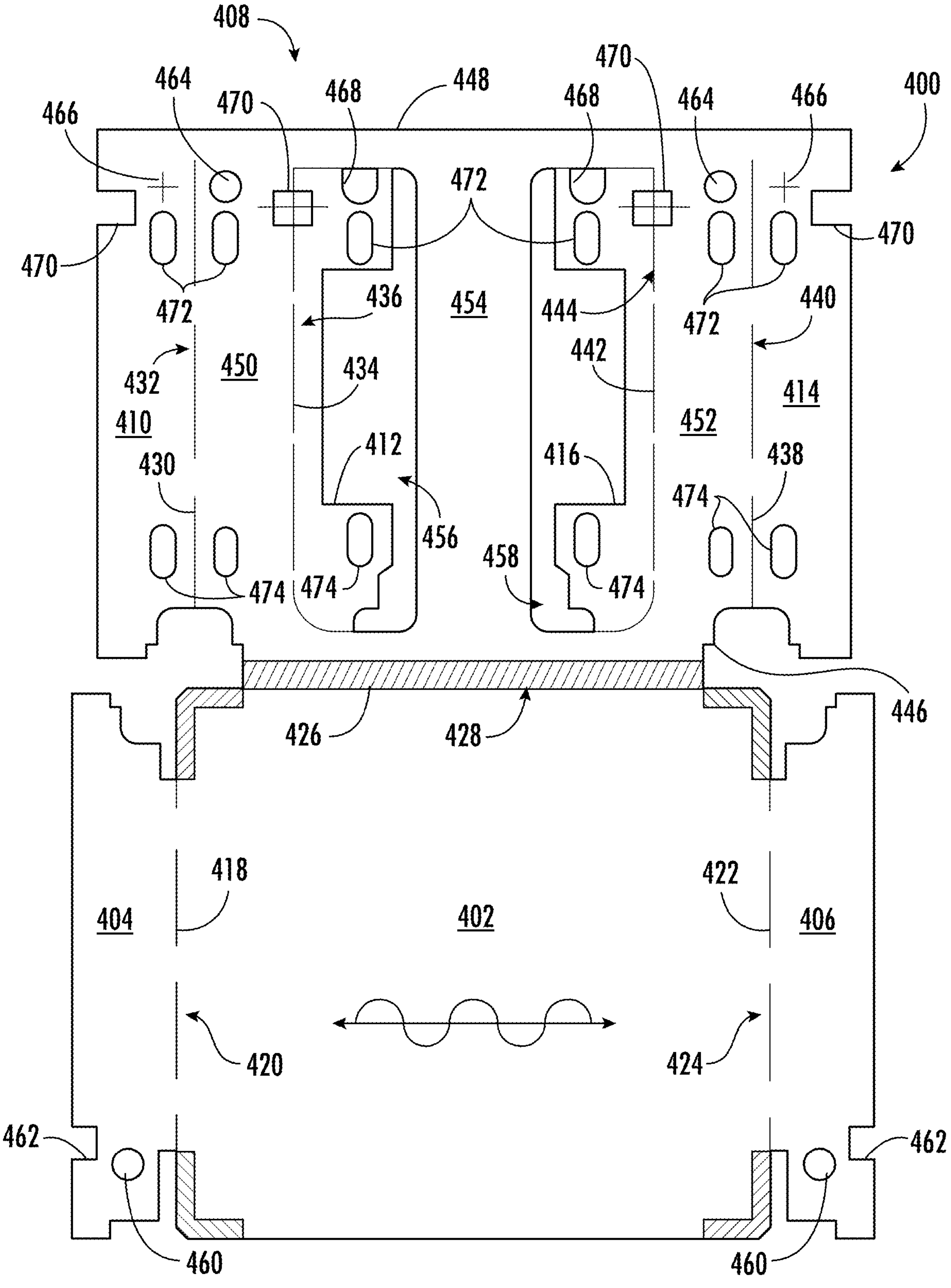
FIGS. 5A-5C are views of a flat blank for forming the packaging base pad of FIG. 4.
Figure 5B:
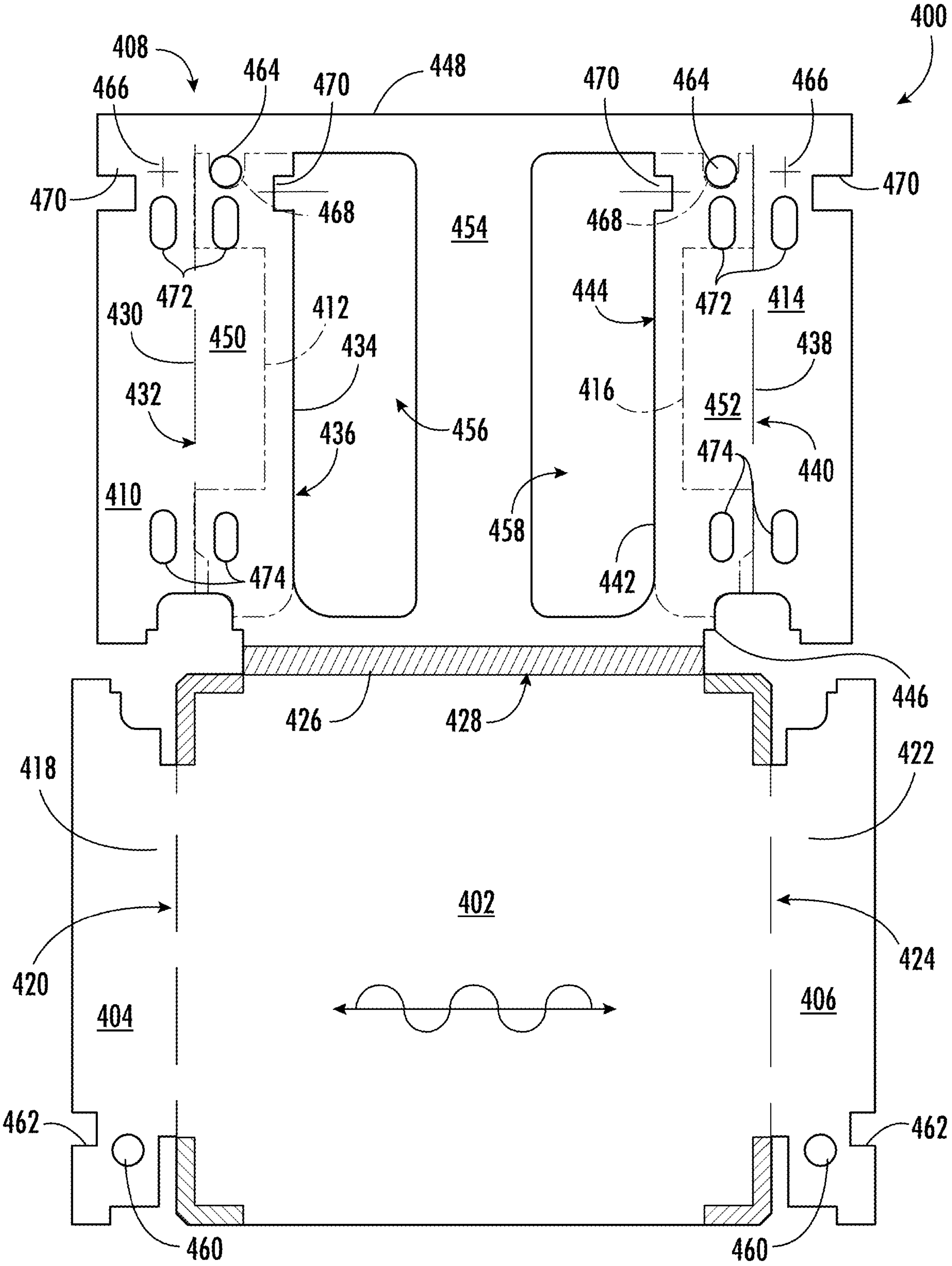
Figure 5C:
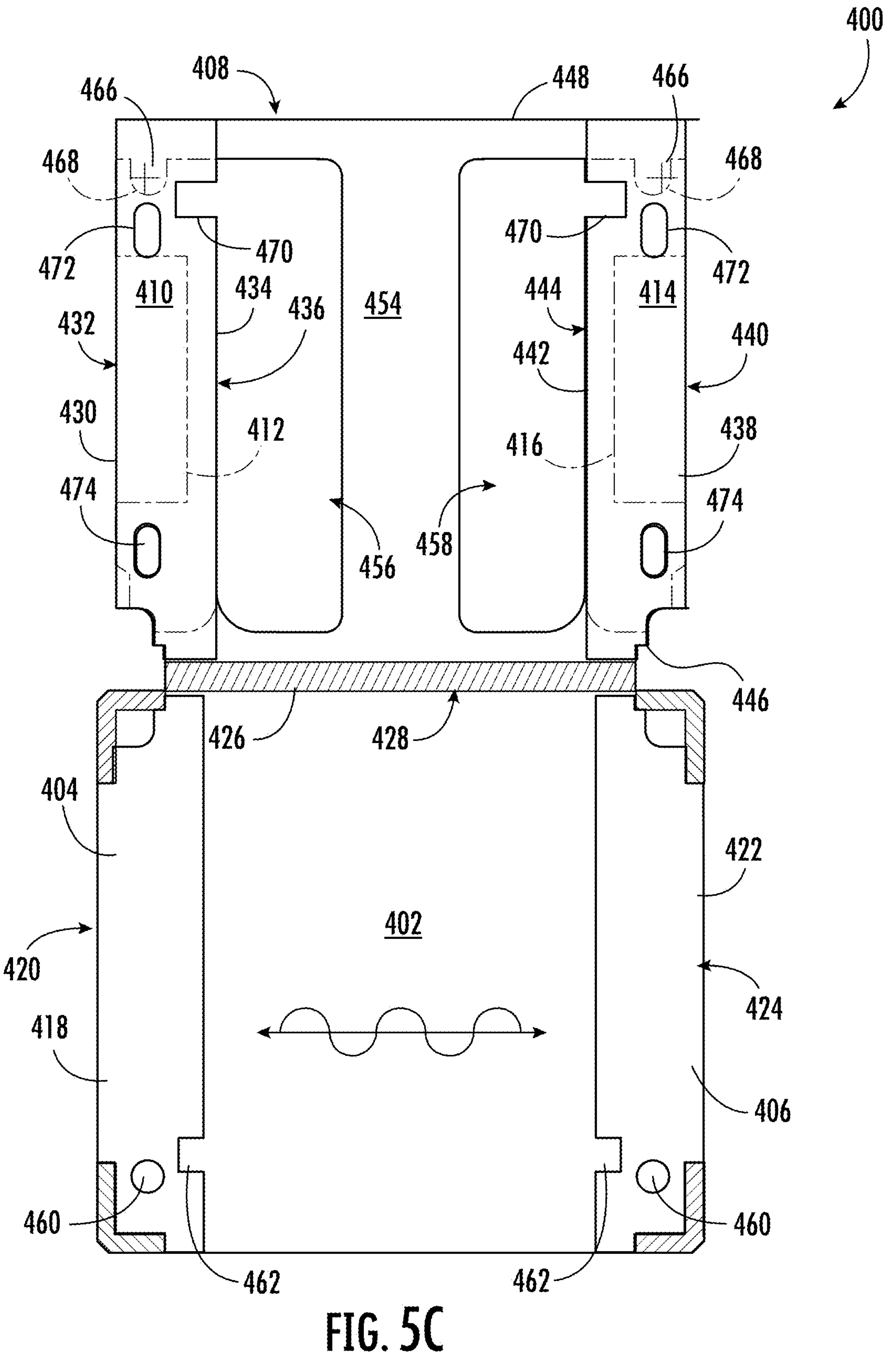

Referring now to FIGS. 5A-5C, a top view of a blank 400 for forming the base pad 206 (FIG. 4) according to one or more example embodiments of the present subject matter is provided. The blank 400 may be referred to herein as a "flat blank" in that the blank 400 is generally stored and/or transported in a flat state prior to use, e.g., forming into a base pad 206. That is, it should be understood that the term "flat blank" refers to the blank 400 in a flat condition, and the terms blank or flat blank may be used interchangeably in at least some contexts herein. As discussed in greater detail below, the flat blank 400 may be used for forming the base pad 206, which is useful in packaging for a domestic appliance to reduce a likelihood of damage to the domestic appliance during transit. The base pad 206 may be used with a packaging assembly 200 for any suitable domestic appliance.

The flat blank 400 may be formed from a corrugated sheet, e.g., of plastic, cardboard or fiberboard, or other suitable material. As will be understood, the corrugated sheet has flutes that extend longitudinally or laterally within the corrugated sheet. For example, the corrugated sheet may be formed from a fluted corrugated board and one or two flat linerboards, and the fluted corrugated board may define flutes within the corrugated sheet. Corrugated sheets are well understood by those skilled in the art and are not described in detail herein.

As generally shown in FIGS. 5A-5C, the blank 400 may include a plurality of sections, e.g., panels and/or flaps, as will be described in more detail below, and such sections may bend relative to one another. For example, the sections of the blank 400 may be bendable along seams or score or fold lines. In various embodiments, the seams or fold lines may be provided in any suitable form, such as straight lines or curved lines, or combinations thereof.

In particular, in the example embodiment illustrated in FIG. 5A, the blank 400 may include a bottom panel 402, a left side panel 404 directly joined to a left side 418 of the bottom panel 402 at a first seam 420, a right side panel 406 directly joined at a right side 422 of the bottom panel 402 at a second seam 424, and a top panel 408 directly joined at a top side 426 of the bottom panel 402 at a third seam 428. The left side panel 404 and the right side panel 406 may each include an aperture 460 configured to receive one respective leg 180 of the oven appliance 100. Further, the left side panel 404 and the right side panel 406 may each include a groove 462 configured to receive a component of the oven appliance 100. The grooves 462 may extend from a side of the respective panel 404, 406 that is spaced from the corresponding seam 420, 424. The grooves 462 may be arranged to permit the component (e.g., a brace) of the oven appliance to pass through the grooves 462 during shipping/transport, which can prevent the component from contacting the base pad 206 thereby reducing a likelihood of the component being damaged during shipping/transport.

Further, the top panel 408 includes a bottom portion 446 arranged at the third seam 428 and a top portion 448 spaced from the bottom portion 446. The top panel 408 further includes a left portion 450, a right portion 452, and a center portion 454 each extending from the bottom portion 446 to the top portion 448. The center portion 454 is arranged between the left portion 450 and the right portion 452. Further, the left portion 450 and the right portion 452 may each include an aperture 464 configured to receive one respective leg 180 of the oven appliance 100. The aperture 464 of the left portion 450 may be arranged to align with the aperture 460 of the left side panel 404 when the blank 400 is formed into the base pad 206. Similarly, the aperture 464 of the right portion 452 may be arranged to align with the aperture 460 of the right side panel 406 when the blank 400 is formed into the base pad 206.

In addition, the top panel 408 includes a first cutout portion 456 and a second cutout portion 458. The first cutout portion 456 is arranged between the left portion 450 and the center portion 454, and the second cutout portion 458 is arranged between the right portion 452 and the center portion 454. The second cutout portion 458 and the first cutout portion 456 may be mirror images of each other relative to the center portion 454.

Still referring to FIG. 5A, the blank 400 includes a left outer side panel 410 directly joined to a left side 430 of the left portion 450 at a fourth seam 432, a left inner side panel 412 directly joined to a right side 434 of the left portion 450 at a fifth seam 436, a right outer side panel 414 directly joined to a right side 438 of the right portion 452 at a sixth seam 440, and a right inner side panel 416 directly joined to a left side 442 of the right portion 452 at a seventh seam 444.

The left outer side panel 410 and the right outer side panel 414 may each include a plurality of slits 466. The plurality of slits 466 may be configured to permit the one respective leg 180 of the oven appliance 100 to pass through the corresponding panel 410, 414 in response to a shock event during shipping/transport. That is, the left outer side panel 410 and the right outer side panel 414 may support the legs 180 of the oven appliance 100 at or adjacent to the plurality of slits 466 prior to a shock event. The plurality of slits 466 may, for example, be arranged in a cross-shape, as shown. However, it should be appreciated that the plurality of slits 466 may be arranged in any other suitable configuration that permits legs of the domestic appliance to pass through the slits 466 during a shock event. The plurality of slits 466 of the left outer side panel 410 may be arranged with the aperture 464 of the left portion 450 and the aperture 460 of the left side panel 404 when the blank 400 is formed into the base pad 206. Similarly, the plurality of slits 466 of the right outer side panel 414 may be arranged with the aperture 464 of the right portion 452 and the aperture 460 of the right side panel 406 when the blank 400 is formed into the base pad 206.

Moreover, the left outer side panel 410 and the right outer side panel 414 may each include a groove 470 configured to receive a component of the oven appliance 100. The grooves 470 may extend from a side of the respective panel 410, 414 that is spaced from the corresponding seam 432, 440. In some embodiments, the left portion 450 and the right portion 452 may also each include a groove 470. In such embodiments, the grooves 470 may extend from a side of the respective portion 450, 452 that is spaced from the corresponding seam 432, 440 of the respective outer panel 410, 414. The grooves 470 may be aligned with the grooves 462 when the blank 400 is formed into the base pad 206. The grooves 470 may be arranged to permit the component (e.g., a brace) of the oven appliance to pass through the grooves 470 during shipping/transport, which can prevent the component from contacting the base pad 206 thereby reducing a likelihood of the component being damaged during shipping/transport.

Furthermore, the left outer side panel 410, the right outer side panel 414, the left portion 450, the right portion 452, the left inner side panel 412, and the right inner side panel 416 may each include a first opening 472 and a second opening 474. The second opening 474 may be disposed closer to the bottom portion 446 than the first opening 472. The first openings 472 of the left outer side panel 410, the left portion 450, and the left inner side panel 412 may be aligned with each other when the blank 400 is formed into the base pad 206. Similarly, the second openings 474 of the left outer side panel 410, the left portion 450, and the left inner side panel 412 may be aligned with each other when the blank 400 is formed into the base pad 206. Further, the first openings 472 of the right outer side panel 414, the right portion 452, and the right inner side panel 416 may be aligned with each other when the blank 400 is formed into the base pad 206. Likewise, the second openings 474 of the right outer side panel 414, the right portion 452, and the right inner side panel 416 may be aligned with each other when the blank 400 is formed into the base pad 206. The first and second openings 472, 474 may be arranged to permit respective features (e.g., an emboss) of the oven appliance to pass through the first and second openings 472, 474 during shipping/transport, which can prevent the component from contacting the base pad 206 thereby reducing a likelihood of the features being damaged during shipping/transport.

The left inner side panel 412 and the right inner side panel 416 may each include a recess 468. Each recess 468 may extend from a top side of the corresponding panel 412, 416. The recess 468 of the left inner side panel 412 may be arranged to align with the aperture 464 of the left portion 450 when the blank 400 is formed into the base pad 206. Similarly, the recess 468 of the inner right panel 416 may be arranged to align with the aperture 464 of the right portion 452 when the blank 400 is formed into the base pad 206.

Figure 6:
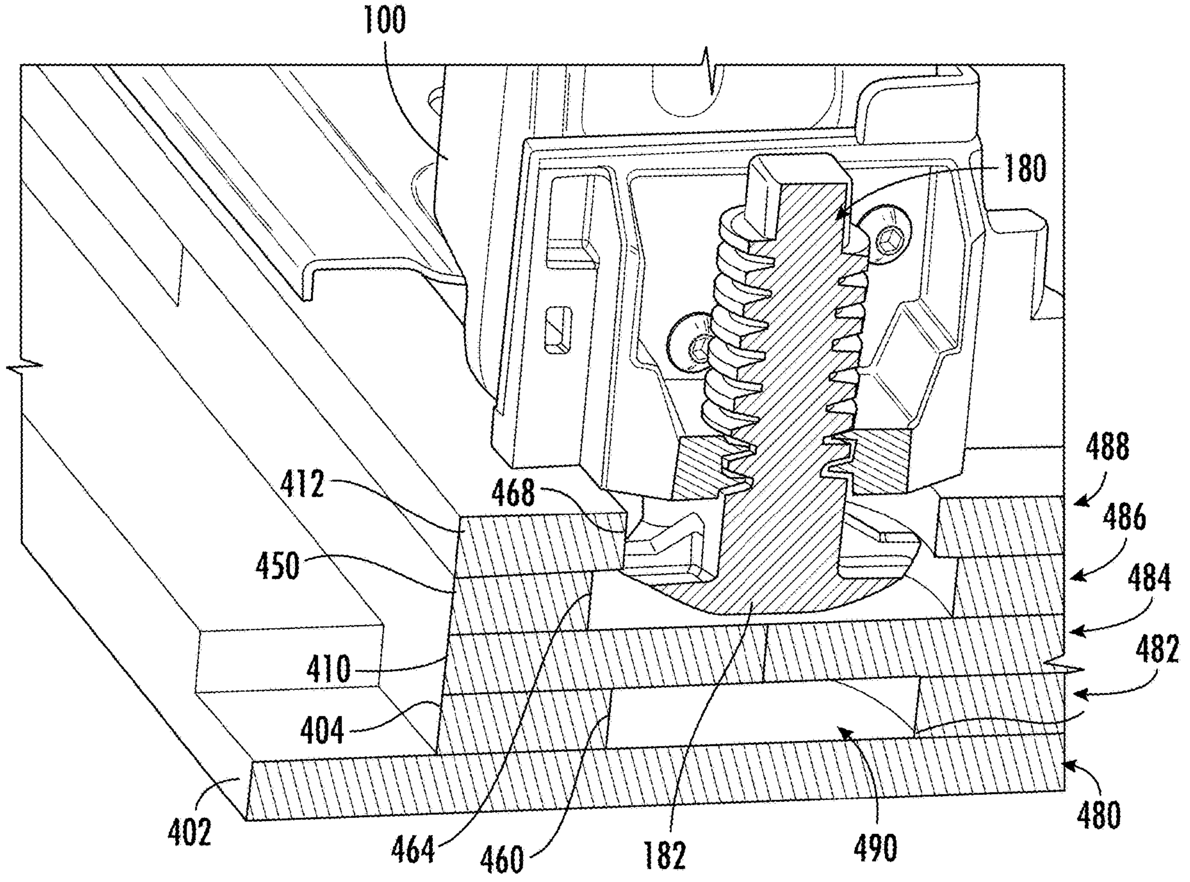
FIG. 6 is an enlarged cross-sectional view of an oven appliance supported by the packaging base pad along Line 6 of FIG. 4.

As illustrated in FIG. 6, the bottom panel 402 may be configured to be a bottom layer 480 of the base pad 206 when the blank 400 is formed into the base pad 206. Further, as shown, the left side panel 404 and the right side panel 406 may be configured to be a first intermediate layer 482 when folded about the first and second seams 420, 424, respectively. Furthermore, as shown, the left outer side panel 410 and the right outer side panel 414 may be configured to be a second intermediate layer 484 when folded about the fourth and sixth seams 432, 440, respectively. As such, the respective plurality of slits 466 of the left and right outer side panels 410, 414 may be arranged directly vertically above the respective apertures 460 of the left and right side panels 404, 406. Moreover, as shown, the top panel 408 may be configured to be a third intermediate later 486 when folded about the third seam 428. As such, the respective apertures 464 of the left and right portions 450, 452 may be arranged directly vertically above the respective plurality of slits 466 of the left and right outer side panels 410, 414. In addition, as shown, the left inner side panel 412 and the right inner side panel 416 may be configured to be a top layer 488 when folded about the fifth and seventh seams 436, 444, respectively. As such, the respective grooves 470 of the left and right inner side panels 412, 416 may be arranged directly vertically above the respective apertures 464 of the left and right portions 450, 452.

Still referring to FIG. 6, the top layer 488 and the third intermediate layer 486 are configured to receive the legs 180 of the oven appliance 100. Further, the top layer 488 is configured to contact the oven appliance 100 around the legs 180 so as to support the oven appliance during shipping/transport. Moreover, the second intermediate layer 484 is configured to contact the bottom 182 of the legs 180. In at least some embodiments, the second intermediate layer 484 may be configured to selectively support the legs 180. For example, the plurality of slits 466 in the left outer side panel 410 and the right outer side panel 414 may be configured to permit the legs 180 to pass through the second intermediate layer 484 in response to a shock event during shipping/transport. As such, the second intermediate layer 484 may absorb energy from the legs 180 during the shock event, which can reduce a likelihood of damage to the legs 180 caused by the shock event.

Furthermore, the first intermediate layer 482 is configured to provide a gap 490 between the second intermediate layer 484 and the bottom layer 480 (e.g., defined by the apertures 460 of the left side panel 404 and the right side panel 406). The gap 490 permits the legs 180 to move relative to the base pad 206 during the shock event, which allows for loads to between the base pad 206 (i.e., the five layers 480, 482, 484, 486, 488 thereof) and the components of the oven appliance 100 around the legs 180, which reduces a likelihood of the legs 180 being damaged during the shock event. Moreover, the bottom layer 480 is configured to contact the legs 180 after the legs 180 travel through the gap 490 to further absorb loads from the shock event.

Figure 7:
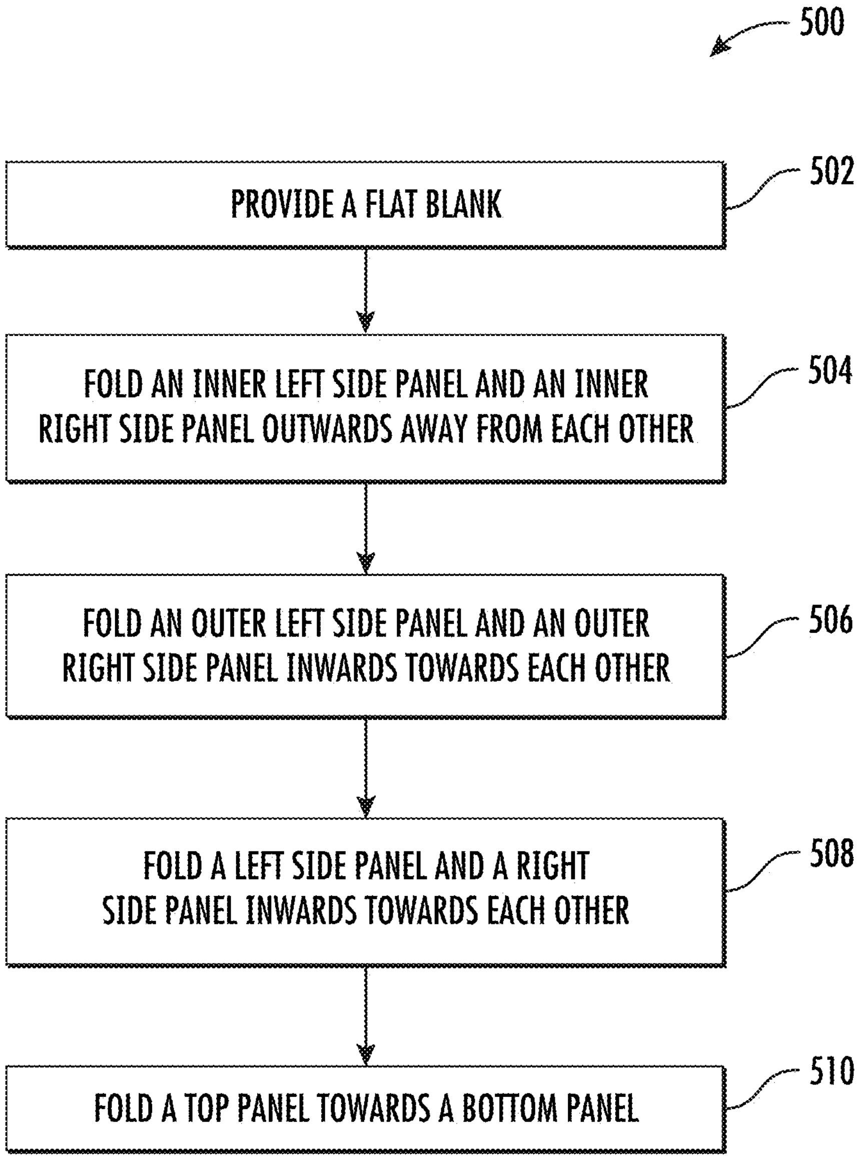
FIG. 7 is a flow chart diagrammatically illustrating a method of forming a packaging base pad for a domestic appliance according to one or more additional example embodiments of the present subject matter.

As mentioned above, embodiments of the present disclosure also includes a method of forming a packaging base pad 206 for an oven appliance 100, such as an example method 500 illustrated in FIG. 7. As illustrated in FIG. 7, the method 500 may include an initial step 502 of providing a flat blank. For example, the flat blank which is provided in step 502 may be the blank 400 in a flat condition illustrated in FIG. 5A and described above. Thus, the flat blank provided in step 502 may include the bottom panel 402, the left side panel 404, the right side panel 406, and the top panel 408. The flat blank provided in step 502 may further include the left outer side panel 410, the left inner side panel 412, the right outer side panel 414, and the right inner side panel 416.

The method 500 may also include a step 504 of folding the left inner side panel 412 and the right inner side panel 414 outwards away from each other (as shown in FIG. 5B). That is, the left inner side panel 412 and the right inner side panel 414 are folded so as to form a top layer 488 of the base pad 206. The method 500 may further include securing (e.g., via an adhesive or any other suitable manner) the left inner side panel 412 to the left portion 450 and the right inner side panel 414 to the right portion 452.

The method 500 may also include a step 506 of folding the left outer side panel 410 and the right outer side panel 414 inwards towards each other (as shown in FIG. 5C). That is, after step 506, the left portion 450 is arranged between the left inner side panel 412 and the left outer side panel 410, and the right portion 452 is arranged between the right inner side panel 416 and the right outer side panel 414. As such, the left portion 450 and the right portion 452 may form the third intermediate layer 486 of the base pad 206, and the left outer side panel 410 and the right outer side panel 414 may for the second intermediate layer 484 of the base pad 206. The method 500 may further include securing (e.g., via an adhesive or any other suitable manner) the left outer side panel 410 to the left portion 450 and the right outer side panel 414 to the right portion 452.

The method may also include a step 508 of folding the left side panel 404 and the right side panel 406 inwards towards each other (as shown in FIG. 5C). As such the left side panel 404 and the right side panel 406 may form the first intermediate layer 482 of the base pad 206. The method 500 may further include securing (e.g., via an adhesive or any other suitable manner) the left side panel 404 and the right side panel 406 to the bottom panel 402.

The method 500 may further include a step 508 of folding the top panel 408 towards the bottom panel 402. More specifically, the method 500 may include folding the top panel 408 towards the bottom panel 402 such that the left outer side panel 410 contacts the left side panel 404, and the right outer side panel 414 contacts the right side panel 406. The method 500 may further include securing (e.g., via an adhesive or any other suitable manner) the left outer side panel 410 to the left side panel 404 and the right outer side panel 414 to the right side panel 406.

The blank 400 described herein, as well as the packaging base pad 206 formed therefrom and related methods of forming the packaging base pad 206, provide several advantages as will be recognized by those of ordinary skill in the art. For example, one such advantage is that the packaging base pad 206 may be formed from a single blank 400 without needing to join additional parts or cut or otherwise separate or divide one or more sub-parts of the blank 400. As another example, the base pad 206 may include five layers, which can increase energy absorption as compared to existing four-layer base pads, as discussed above. Furthermore, the foregoing example advantages are provided by way of illustration only and are not limiting of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flat blank for forming a packaging base pad for a domestic appliance, the flat blank comprising:

a bottom panel;

a left side panel directly joined to a left side of the bottom panel at a first seam;

a right side panel directly joined to a right side of the bottom panel at a second seam; and a top panel directly joined to a top side of the bottom panel at a third seam, the top panel comprising:

a first portion and a second portion spaced from each other;

a left outer side panel directly joined to a left side of the first portion at a fourth seam;

a left inner side panel directly joined to a right side of the first portion at a fifth seam, the left inner side panel configured to contact the domestic appliance when the flat blank is folded to form the packaging base pad;

a right outer side panel directly joined to a right side of the second portion at a sixth seam; and a right inner side panel directly joined to a left side of the second portion at a seventh seam, the right inner side panel configured to contact the domestic appliance when the flat blank is folded to form the packaging base pad;

wherein the left side panel, the first portion, and the left outer side panel are configured to be intermediate layers arranged between the bottom panel and the left inner side panel when the flat blank is folded to form the packaging base pad, and the right side panel, the second portion, and the right outer side panel are configured to be intermediate layers arranged between the bottom panel and the right inner side panel when the flat blank is folded to form the packaging base pad.

2. The flat blank of claim 1, wherein the first portion includes a first aperture configured to receive a first leg of the domestic appliance, and the second portion includes a second aperture configured to receive a second leg of the domestic appliance.

3. The flat blank of claim 2, wherein the left inner side panel includes a first recess configured to receive the first leg of the domestic appliance and the right inner side panel includes a second recess configured to receive the second leg of the domestic appliance, when the flat blank is folded to form the packaging base pad, the first recess being directly above the first aperture and the second recess being directly above the second aperture.

4. The flat blank of claim 2, wherein the left outer side panel includes a plurality of slits configured to selectively receive the first leg of the domestic appliance and the right outer side panel includes a plurality of slits configured to selectively receive the second leg of the domestic appliance, when the flat blank is folded to form the packaging base pad, the plurality of slits of the left outer side panel being directly below the first aperture and the plurality of slits of the right outer side panel being directly below the second aperture.

5. The flat blank of claim 2, wherein the left side panel includes a third aperture configured to receive the first leg of the domestic appliance and the right side panel includes a fourth aperture configured to receive the second leg of the domestic appliance, when the flat blank is folded to form the packaging base pad, the third aperture being aligned with the first aperture and the fourth aperture being aligned with the second aperture when the flat blank is folded to form the packaging base pad.

6. The flat blank of claim 5, wherein, when the flat blank is folded to form the packaging base pad, the left outer side panel is arranged vertically between the first aperture and the third aperture and the right outer side panel is arranged vertically between the second aperture and the fourth aperture.

7. The flat blank of claim 1, wherein when the flat blank is folded to form the packaging base pad, the left side panel is arranged vertically between the left outer side panel and the bottom panel and the right side panel is arranged vertically between the right outer side panel and the bottom panel.

8. The flat blank of claim 7, wherein, when the flat blank is folded to form the packaging base pad, the first portion is arranged vertically between the left inner side panel and the left outer side panel and the second portion is arranged vertically between the right inner side panel and the right outer side panel.

9. The flat blank of claim 1, wherein the top side extends from the left side to the right side.

10. The flat blank of claim 1, wherein the top panel further comprises a bottom portion at the third seam and a top portion spaced from the bottom portion, the top portion and the bottom portion extending from the first portion to the second portion.

11. The flat blank of claim 10, wherein the first portion, the second portion, the bottom portion, and the top portion define, at least partially, a cutout portion therebetween.

12. The flat blank of claim 11, wherein the top panel further includes a third portion arranged between the first portion and the second portion, the left inner side panel and the right inner side panel each being spaced from the third portion.

13. A method of forming a packaging base pad for a domestic appliance, comprising:

providing a flat blank, the flat blank comprising:
- a bottom panel;
  - a left side panel directly joined to a left side of the bottom panel at a first seam;
  - a right side panel directly joined to a right side of the bottom panel at a second seam;
  - a top panel directly joined to a top side of the bottom panel at a third seam, the top panel comprising:
    - a first portion and a second portion spaced from each other;
    - a left outer side panel directly joined to a left side of the first portion at a fourth seam;
    - a left inner side panel directly joined to a right side of the first portion at a fifth seam;
    - a right outer side panel directly joined to a right side of the second portion at a sixth seam;
    - a right inner side panel directly joined to a left side of the second portion at a seventh seam;

folding the left inner side panel and the right inner side panel of the flat blank outwards away from each other;

folding the left outer side panel and the right outer side panel of the flat blank inwards towards each other;

folding the left side panel and the right side panel of the flat blank inwards towards each other; and folding the top panel towards the bottom panel.

14. The method of claim 13, wherein, after folding the top panel towards the bottom panel, the left inner side panel and the right inner side panel are configured to contact the domestic appliance.

15. The method of claim 13, wherein, after folding the top panel towards the bottom panel, the left side panel, the left outer side panel, and the first portion are arranged vertically between the bottom panel and the left inner side panel, and the right side panel, the right outer side panel, and the second portion are arranged vertically between the bottom panel and the right inner side panel.

16. The method of claim 13, wherein, after folding the top panel towards the bottom panel, the left outer side panel contacts the left side panel and the right outer side panel contacts the right side panel.

17. The method of claim 13, wherein the first portion includes a first aperture configured to receive a first leg of the domestic appliance, and the second portion includes a second aperture configured to receive a second leg of the domestic appliance.

18. The method of claim 17, wherein the left inner side panel includes a first recess configured to receive the first leg of the domestic appliance, and the right inner side panel includes a second recess configured to receive the second leg of the domestic appliance, wherein folding the left inner side panel and the right inner side panel outwards away from each other further comprises:

aligning the first recess with the first aperture; and aligning the second recess with the second aperture.

19. The method of claim 18, wherein the left outer side panel includes a plurality of slits configured to selectively receive the first leg of the domestic appliance and the right outer side panel includes a plurality of slits configured to selectively receive the second leg of the domestic appliance, wherein folding the left outer side panel and the right outer side panel inwards towards each other further comprises:

aligning the plurality of slits of the left outer side panel with the first recess; and aligning the plurality of slits of the right outer side panel with the second recess.

20. The method of claim 19, wherein the left side panel includes a third aperture configured to receive the first leg of the domestic appliance and the right side panel includes a fourth aperture configured to receive the second leg of the domestic appliance, wherein folding the top panel towards the bottom panel further comprises:

aligning the third aperture with the plurality of slits of the left side panel; and aligning the fourth aperture with the plurality of slits of the right side panel.

* * * * *